Figure 1:
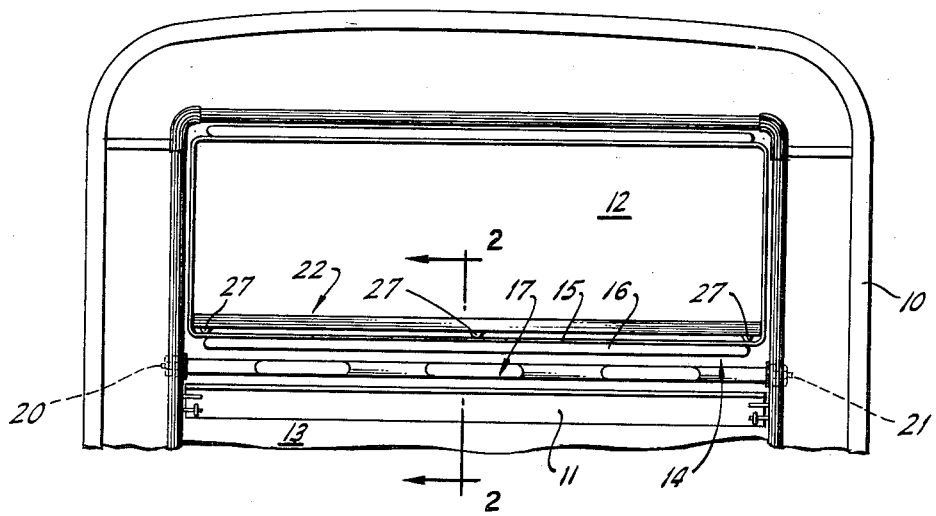

Nov. 16, 1954     M. G. SHOEMAKER     2,694,297
REFRIGERATION APPARATUS WITH MEANS FOR MAINTAINING
FOOD IN FROZEN CONDITION DURING DEFROSTING
Filed Nov. 1, 1951

INVENTOR.
MALCOLM G. SHOEMAKER
BY
Brown, Denk & Synnestvedt
AGENTS

United States Patent Office 2,694,297
Patented Nov. 16, 1954

2,694,297

REFRIGERATION APPARATUS WITH MEANS FOR MAINTAINING FOOD IN FROZEN CONDITION DURING DEFROSTING

Malcolm G. Shoemaker, Doylestown, Pa., assignor to Philco Corporation, Philadelphia, Pa., a corporation of Pennsylvania Application November 1, 1951, Serial No. 254,263

2 Claims. (Cl. 62—103)

The present invention relates to refrigeration apparatus and, more particularly, to domestic refrigerators of the type having an evaporator which is adapted to freeze food as well as to maintain frozen food at freezing temperatures and which is further adapted to be heated, at desired or predetermined intervals, to effect removal of frost from the cooling surfaces of such an evaporator.

With a refrigerator of the above mentioned variety, the food which is to be frozen or which has been previously frozen, is usually placed upon a surface of the evaporator. However, the placement of frozen food on an evaporator surface is found objectionable when the evaporator is of the type adapted to be subjected to heat for the purpose of effecting rapid defrosting. The reasons for the objections are that, during those intervals when heat is supplied to the evaporator to rid its surfaces of frost, the frozen food is apt to take up some of the heat so that thawing of the food is likely to ensue and the food may become spoiled or damaged.

It is an important object of the invention to overcome the above noted objections by providing means in novel association with a defrostable evaporator, said means serving to support frozen food and to prevent undue rise in the temperature of the supported food during heating of the evaporator to defrost the same.

Broadly, this objective and resulting advantages of the invention are realized by utilizing means which, during normal refrigerating operation, functions in cooperation with the evaporator to maintain frozen food at sub-freezing temperatures and which, during heating of the evaporator, serves as a heat absorbing medium between the evaporator and the supported frozen food in order to protect the same against temporary subjection to thawing action. In a practicable embodiment of the invention, means in the form of a shelf-like hollow plate member or casing which contains a congealable substance and provides a surface to support frozen food, is placed over that surface of the evaporator upon which the food would usually rest. The substance which is contained within said plate member or casing is such that it freezes solidly at normal refrigerating temperatures of the evaporator and maintains frozen food at temperatures above thawing whenever heat is applied to the associated evaporator to effect defrosting of its surfaces.

Figure 2:
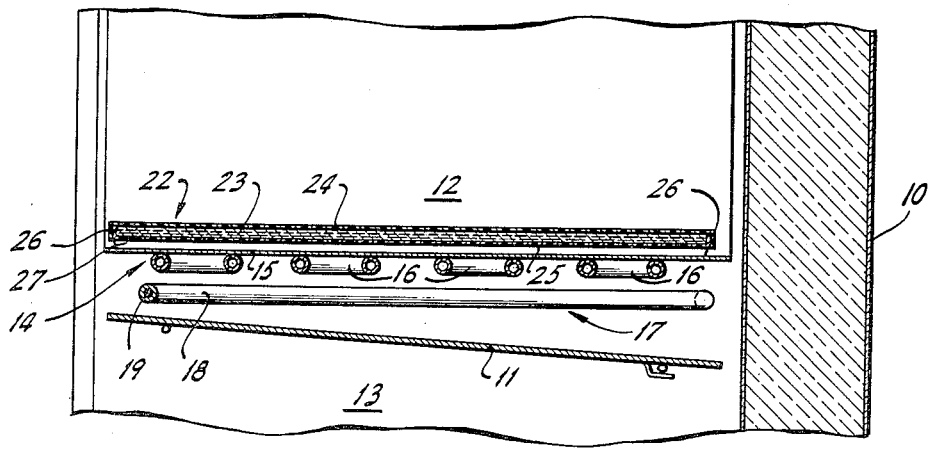

The novel features of the invention and the manner in which the above recited and other objectives and advantages are best achieved, will clearly appear from the following description of the embodiment illustrated in the accompanying drawing, in which:

Figure 1 is a front elevation of a portion of a refrigerator embodying the present invention; and Figure 2 is an enlarged vertical section taken substantially on line 2—2 of Figure 1.

With more particular reference to the drawing, it will be seen that the invention is illustrated as embodied in a domestic refrigerator which includes a cabinet 10 of usual insulated construction. The interior of the cabinet is sub-divided, by means of a baffle 11 of suitable known design, into an upper freezing compartment 12 and a lower non-freezing compartment 13.

The upper compartment is utilized as a cold zone adapted for the storage of frozen food and, for that purpose, an evaporator 14 is arranged above the mentioned baffle to span the space between the side walls of the cabinet. As shown, the evaporator comprises a metallic sheet body 15 provided with a serpentine conduit 16 adapted to circulate refrigerant in heat exchange relation with said body. The evaporator forms part of a refrigerant circulating system and is arranged in usual series flow circuit with the customary compressor and condenser of such a system. The compressor and condenser and their connections with the evaporator conduit are not shown inasmuch as the construction and association of these elements are well known. The cooperative function of the mentioned elements of the system are also well known, and it is here sufficient to state that liquid refrigerant is fed to the evaporator where the refrigerant evaporates and absorbs heat in the process, and that heat-laden gaseous refrigerant is withdrawn from the evaporator into the compressor and is discharged into the condenser wherein the compressed gaseous refrigerant rejects heat and is reconverted into liquid for re-feeding to the evaporator.

The refrigeration effect which occurs in the evaporator, of course, keeps the surfaces of the latter in a cold condition so that moisture in the air which circulates about the evaporator, migrates to said cold surfaces and accumulates thereon in the form of frost. As is well recognized, accumulation of a substantial amount of frost on the surfaces of the evaporator impairs the heat transfer properties of the latter and, to remedy this impediment, it is from time to time necessary to remove accumulated frost. Removal of the frost is conveniently accomplished by heating the evaporator, at desired or periodic intervals, to a temperature sufficiently high to melt the frost. This heating of the evaporator can be satisfactorily obtained through utilization of various methods, for instance, by temporarily introducing hot gaseous refrigerant in the evaporator circuit or by temporarily subjecting the frosted evaporator surfaces to the effect of heat generated through energization of an electrical resistance heater. The latter method is shown in the drawing, and a heater suitable for the purpose is illustrated at 17 and, as seen in Figure 2, is of the type which has an outer metal sheath 18 to protect electrical conductor 19 against moisture. With the arrangement as shown in the drawing, the heater is disposed between the baffle 11 and the evaporator 14 and is provided with terminals 20 and 21 adapted for connection with known switch means and electrical circuits (not shown) designed to control the energization of the heater as well as the operation of the motor-compressor. Reference may be had to my copending application Ser. No. 230,357, filed June 2, 1951, for construction and operation of suitable switch means and circuits. Upon energization of the heater to carry out defrosting of the evaporator, the surfaces of the latter naturally become heated, with the result that frozen food if in contact with the evaporator, would be subjected to such temperatures as are apt to cause unwanted and deleterious thawing of the food.

In accordance with the present invention, the above noted undesirable reaction on the frozen food is effectively prevented by means of a plate member 22 which overlies the evaporator and rests thereon, and which provides a surface for supporting frozen food out of direct contact with said evaporator. As seen in Figure 2, the plate member 22 is hollow and contains a congealable substance 23. This substance is such that it freezes solid during normal refrigerating operation of the evaporator, and melts at a sufficiently slow rate to produce the necessary refrigerating effect to maintain food in frozen condition when heat is applied to the evaporator in order to defrost its surfaces. It has been found that the eutectic solution of water and potassium chloride which has a freezing-melting point of approximately +12° F., is suitable to accomplish the desired result.

In practice and as illustrated in Figure 2, the plate member 22 is advantageously made of two relatively thin sheets 24 and 25 of material of low thermal conductivity, such as plastic material, the marginal edges of said sheets being joined together, for instance, as is represented at 26, to form a casing for the congealable substance. Also, in practice, the plate member or casing is advantageously supported in slightly spaced relation with respect to the evaporator surface which underlies said plate and, for that purpose, the plastic sheet 25 which normally forms the bottom side of said plate member or casing, conveniently includes ridge-like projections 27 which rest on said evaporator surface. The spacing of the plate member from the evaporator provides a confined dead air space which, in conjunction with the plastic material of the plate member, tends to retard transfer of heat to the congealed substance within said plate member. For that reason, a rather considerable amount of heat can be applied to the evaporator for a time long enough to secure proper defrosting of the evaporator surfaces, without completely melting the congealed substance or adversely affecting the temperature of food supported upon the surface of said plate member.

In use, the plate member 22 containing the congealable substance is placed, as hereinbefore indicated, over and upon an evaporator surface which would normally serve to support the frozen food. By way of example, assuming that to insure preservation of frozen food, it is desired to maintain the freezing compartment within a temperature range of from −5° to +5° F. and that this temperature range is best obtained when the evaporator surfaces are cooled to a temperature ranging from −10° to 0° F., then the congealable substance (having a freezing point of approximately +12° F.) will freeze solid, and remain so frozen, during normal refrigerating operation of the evaporator. Accordingly, so long as the evaporator continues to function normally, the plate member 22 will cooperate with said evaporator to maintain, in freezing condition, the food which is supported on said member within the freezing compartment. Again by way of example, assuming that to insure adequate melting and removal of frost from the evaporator surfaces, it is desired to raise the temperature of said surfaces to, say, +45° F. through energization of the heater 17, then, upon operation of said heater, the condition is created which would normally result in raising the temperature of the frozen food to a point where thawing of said food would occur. However, according to the invention, the frozen substance within the plate member 22 absorbs most of the heat which is dissipated by the evaporator surfaces. Of course, in absorbing this heat, the temperature of the frozen substance gradually rises, and the substance begins to melt when its melting point temperature (approximately +12° F.) is reached. During the melting process, the temperature of the substance will not rise above +12° F. and the frozen food is therefore maintained in proper condition in spite of the fact that the evaporator surfaces are heated to a temperature (+45° F.) which would normally cause thawing of the frozen food. Thus, the plate member 22 constructed and functioning according to the invention, provides the necessary thermo fly-wheel or hold-over effect to prevent undue rise in the frozen food temperature, while defrosting of the evaporator surfaces is in progress.

From the foregoing, it will be appreciated that the invention provides an extremely simple yet most advantageous arrangement capable of efficiently preventing the damaging effect which repeated freezing and thawing would have on the stored food as a result of alternate cooling and heating of the evaporator surfaces. Particularly, the provision of a removable plate-like member which can be readily associated with a defrostable evaporator to serve as a means both to support food and to prevent unwanted temperature rise of the food during defrosting of the evaporator, contributes toward increasing the usefulness and effectiveness of a domestic refrigerator.

I claim:

1. A refrigerator comprising a freezing compartment including an evaporator adapted to be refrigerated at temperatures below freezing and adapted to be defrosted by subjection to heat at temperatures above freezing, and means for maintaining food in frozen condition within said compartment during defrosting of said evaporator, said means including a structure for supporting food within said freezing compartment and consisting of a plate-like casing which contains a congealable substance and overlies a substantially horizontal surface of said evaporator, said substance congealing at the temperature to which it is subjected by said surface of said evaporator during refrigeration thereof, said casing being provided with projections which support the latter upon and in spaced relation to said horizontal surface of said evaporator.

2. A refrigerator comprising an evaporator having a substantially horizontal surface adapted to be refrigerated at temperatures below freezing, a heat generator disposed below said surface to heat the same and effect defrosting thereof, and a plate member disposed above said surface to support food out of contact with said surface, said member confining a congealable substance between said surface and food which may be supported by said member, said substance congealing at the refrigerated temperature of said surface to retard heating of the food which may be supported by said member during defrosting of said surface.

References Cited in the file of this patent

UNITED STATES PATENTS

| Number | Name | Date |
|---|---|---|
| 1,913,433 | Doble, Jr. | June 13, 1933 |
| 2,024,612 | Sulzberger | Dec. 17, 1935 |
| 2,257,925 | Vretman | Sept. 9, 1941 |
| 2,272,302 | Krackowizer | Feb. 10, 1940 |